United States Patent [19]

Saji et al.

[11] Patent Number: 5,209,068

[45] Date of Patent: May 11, 1993

[54] STATIC MAGNETIC REFRIGERATOR

[75] Inventors: Yoshiro Saji; Hiroaki Toda; Tetsuo Takagi; Takao Sugioka; Masaru Inoue; Kohei Otani; Manabu Sato, all of Osaka, Japan

[73] Assignee: Koatsu Gas Kogyo Co., Ltd., Osaka, Japan

[21] Appl. No.: 819,887

[22] Filed: Jan. 13, 1992

[30] Foreign Application Priority Data

Jan. 22, 1991 [JP] Japan ................................... 3-22894

[51] Int. Cl.⁵ ............................................. F25B 21/00
[52] U.S. Cl. ........................................ 62/3.1; 62/467;
505/891
[58] Field of Search ..................... 62/3.1, 467; 505/891

[56]  References Cited

U.S. PATENT DOCUMENTS

| | | | |
|---|---|---|---|
| 4,033,734 | 7/1977 | Steyert, Jr. et al. | 62/3.1 |
| 4,107,935 | 8/1978 | Steyert, Jr. | 62/3.1 |
| 4,332,135 | 6/1982 | Barclay et al. | 62/3.1 |
| 4,457,135 | 7/1984 | Hakuraku et al. | 62/3.1 |
| 4,507,927 | 4/1985 | Barclay | 62/3.1 |
| 4,554,790 | 11/1985 | Nakagome et al. | 62/3.1 |
| 4,599,866 | 7/1986 | Nakagome et al. | 62/3.1 |
| 4,625,519 | 12/1986 | Hakuraku et al. | 62/3.1 |
| 5,024,059 | 6/1991 | Noble | 62/3.1 |

Primary Examiner—Ronald C. Capossela
Attorney, Agent, or Firm—Koda and Androlia

[57]  ABSTRACT

A static magnetic refrigerator comprising a magnet generating a high-intensity magnetic field, a magnetic working material disposed in the high-intensity magnetic field, a magnetic shield disposed between the magnet and the magnetic working material, and a rotating means for rotating the magnetic shield, the magnetic shield comprising a pair of nearly parallel flat plates or a pair of outwardly curved plates facing each other and made of a superconductor, and the magnetic working material is accommodated in the inner space form by the pair of the flat or curved plates, whereby a magnetization process wherein the magnetic working material is magnetized in the high-intensity magnetic field by way of rotating the magnetic shield at a position allowing the permeation of the magnetic field through the magnetic working material via the pair of the flat or curved plates and a demagnetization process wherein the magnetic working material is demagnetized by way of further rotating the superconducting magnetic shield at another position permitting the shield of the magnetic field via the pair of the flat or curved plates are repeated by the rotating means so that the magnetic working material generates coldness.

8 Claims, 7 Drawing Sheets

STATIC MAGNETIC REFRIGERATOR

BACKGROUND OF THE INVENTION

1. Field of the Invention

The present invention relates to a static magnetic refrigerator which has a magnetic shield between a magnet for generating a high-intensity magnetic field and a magnetic working material, and activates the magnetic working material to generate coldness.

2. Prior Art

A magnetic refrigerator is a refrigerator which repeats a magnetization process wherein a magnetic working material disposed in a high-intensity magnetic field is adiabatically magnetized by the magnetic field and a process wherein the magnetic field is shut off quickly and the magnetic working material is adiabatically demagnetized so that the magnetic working material generates coldness in the adiabatic demagnetization process.

In conventional magnetic refrigerators, superconducting coils are widely used for magnets which generate high-intensity magnetic fields. The conventional magnetic refrigerators are generally classified into a static type which repeatedly turns on and off the current of the superconducting coil for forming a magnetic field while the magnetic working material is fixed, and an unstatic type which repeats a magnetization process wherein the magnetic working material is magnetized in the highest intensity magnetic field formed by the superconducting coil and a process wherein the magnetic working material is moved to an almost-zero-intensity magnetic field position away from the coil and demagnetized, while constant current flows in the superconducting coil at all times.

The static magnetic refrigerating method wherein the magnetization and demagnetization of the magnetic working material are repeated while the magnetic working material is fixed is convenient for the heat transfer between the magnetic working material and a heat transfer medium. This method can solve the problems described below relating to the reciprocating and rotating operations of the magnetic working material. However, when repeating the magnetization and demagnetization using a conventional method, it is difficult to turn on and off the current flowing in the superconducting coil which controls the generated magnetic field. In addition, turning on and off the large current causes a large Joule heat loss in the external power supply system for the method. This method is thus not practical for industrial applications.

In the method of using the superconducting coil in the permanent current mode and reciprocating or rotating the magnetic working material between the inside of the high-intensity magnetic field being generated at all times and an almost-zero-intensity magnetic field away from the magnetic field coil, however, if the magnetic working material is moved to a completely-zero-intensity magnetic field away from the magnetic field coil in the demagnetization process, the reciprocating or rotating movement distance of the magnetic working material must be made significantly large. As a result, the size of such a refrigerator is required to be made comparatively large while its refrigerating performance is rather low, and a complicated movement means is necessary. The movement stroke is therefore set at a practically satisfactory value. In this case, however, the demagnetization process ends in a residual magnetic field and the magnetic flux density in the magnetic working material is not zero. Consequently, the cooling efficiency in such a demagnetization process is inevitably lower than that in the demagnetization process conducted in a zero-flux density magnetic field. The deviation from the ideal magnetic Carnot cycle diagram for the magnetic working material becomes large, thereby reducing the efficiency of the conventional magnetic refrigerator.

Furthermore, as friction heat is generated by the movement means of the magnetic working material, the efficiency of the refrigerator is lowered. To use the coldness obtained by the refrigerator in practice, the cooling medium of the refrigerator must be circulated in the magnetization and demagnetization processes. However, it is difficult to produce a means which transfers heat to the reciprocating or rotating magnetic working material by contacting the medium to the magnetic working material and simultaneously selects the supply of the cooling medium in the magnetization process and the supply of the coldness transfer medium in the demagnetization process by switching operation. Furthermore, the leakage of the mediums at the periphery of the magnetic working material cannot be prevented, resulting in a cause for the reduction of the thermal efficiency of the refrigerator.

As a conventional technology wherein the movement stroke of the magnetic working material is shortened and demagnetization is performed in a zero-intensity magnetic field, there is a known method, wherein a superconducting sub-coil disposed coaxially at the proximity of the main superconducting coil for generating a high-intensity magnetic field for magnetization generates an opposite magnetic field which cancels the magnetic field generated by the main superconducting coil to form a zero-intensity magnetic field region by the cancellation at a position very close to the opening of the main superconducting coil and to reciprocally move the magnetic working material between the high-intensity magnetic field of the main superconducting coil and the zero-intensity magnetic field region.

In the case of the above-mentioned static magnetic refrigerator in which the magnetic working material is fixed, a type which uses the superconducting coil in the permanent current mode to magnetize and demagnetize the magnetic working material is the most favorable refrigerator, since it requires no complicated movement means for the magnetic working material and no superconducting coil, and the energy efficiency of the refrigerator is superior. As a prior art which achieves this type of refrigerator, a refrigerator which magnetically shields and demagnetizes the magnetic working material by fixing the magnetic working material outside the opening of the superconducting coil and by using a magnetic shield provided reciprocatively between the superconducting coil and the magnetic working material has been disclosed in the Japanese Patent Publication No. 63-31716. The flat plane of the magnetic shield described in the publication has the shape of a small plate being smaller than the opening surface of the coil. Since the plate-shaped magnetic shield is smaller than the sectional area of the high-intensity magnetic field, no magnetic shield space is formed behind the magnetic shield. It is therefore almost impossible to demagnetize the magnetic working material. This case is explained as follows. If the plate has high-intensity magnetism, the magnetic lines of force simply permeate the plate, and if the plate is a superconducting plate, the magnetic lines of force pass around the plate to its rear side. In other words, a magnetic shield space can be formed behind a plate-shaped magnetic shield only when the surface area of the plate is sufficiently larger than the sectional area of the magnetic field generation source located ahead of the plate.

By a separate application, the inventors of the present invention have already proposed a magnetic refrigerator having a tube-shaped superconducting magnetic shield disposed between the superconducting coil and the magnetic working material to adiabatically magnetize the magnetic working material in the high-intensity magnetic field of the superconducting coil and to adiabatically demagnetize the magnetic working material by inserting or accommodating the magnetic working material into the hollow section of the magnetic shield disposed close to the coil. [Japanese Pat. Appln's Nos. 2-305586 and 3-59637, U.S. patent application Ser. No. 07/788,100, Canadian Pat. Appln (which appln number is still unknown), and European Pat. Appln No. 91202909.7]

With this refrigerator, the magnetic working material accommodated in the hollow section of the magnetic shield can be completely demagnetized by activating the reciprocating means for reciprocating the magnetic working material or the magnetic shield through the use of the fact that a completely-zero-intensity magnetic field can be achieved in the hollow section of the superconducting cylinder even if the magnetic working material is accommodated in a very high-intensity magnetic field capable of achieving a magnetic flux density of 5 T or more. In addition, since the magnetic shield can completely shield the high-intensity magnetic field even if it is disposed at a position close to or at the center of the high-intensity magnetic field coil, the reciprocating stroke can be made shorter. Furthermore, if the magnetic shield is reciprocated, the same result as that described above can be obtained by fixing the magnetic working material in a constant magnetic field which is generated when the superconducting coil is used in the permanent current mode. The cooling operation by the cooling medium and the circulation of the cooling medium can thus be extremely simplified and the above-mentioned problems caused by the conventional method can be solved.

Even in the method of using the cylindrical magnetic shield, however, a reciprocating means is still necessary although the stroke of the movement is short. Moreover, by fixing the magnetic working material and by moving the magnetic shield instead of the magnetic working material, the performance of the static magnetic refrigerator can be made superior. However, this case also causes problems; for example, large force is necessary to reciprocate the magnetic shield in a high-intensity magnetic field.

SUMMARY OF THE INVENTION

Accordingly, the object of the present invention is to provide a compact simplified practical static magnetic refrigerator with a relatively high cooling performance, by fixing the magnetic working material in a lasting constant high-intensity magnetic field and by disposing a repetitive magnetizing and demagnetizing means different from that used in the reciprocating method for the above-mentioned cylindrical superconducting magnetic shield.

Another object of the present invention is to increase the refrigerating efficiency of the magnetic refrigerator by realizing a complete demagnetization space for the magnetic working material, which cannot be realzied by the plate-shaped magnetic shield of the prior art.

To achieve the above-mentioned objects, the genus invention of the present invention applies a method of rotating the movement means of the magnetic shield by disposing two superconducting magnetic shields separated from each other with a space therebetween for accommodating a magnetic passage and a magnetic working material and by utilizing the space for both magnetization and demagnetization. This genus invention can be further classified into a first invention which uses a pair of plate-shaped superconductors and a second invention which uses two block-shaped superconductors.

BRIEF DESCRIPTION OF THE DRAWINGS

FIGS. 1($a$) and 1($b$) show the operating principle of the magnetic refrigerator of the first invention wherein a magnetic shield comprises a pair of superconducting flat plates.

FIGS. 2($a$) and 2($b$) show the operating principle of the magnetic refrigerator of the first invention wherein a magnetic shield comprises a pair of superconducting curved plates.

FIGS. 4($a$) and 4($b$) are sectional views of an example of the magnetic refrigerator of the first invention used at a temperature below the liquid helium temperature, with a magnetic working material being in the magnetization process.

FIG. 5($a$) and 5($b$) are similar to FIGS. 4($a$) and 4($b$), with the magnetic working material being in the demagnetization process.

FIGS. 7($a$) and 7($b$) are perspective views of the magnetic shields comprising a sintered body of superconductor oxide.

FIGS. 8($a$) and 8($b$) are the operating principle of the magnetic shield of the second invention wherein the magnetic shield comprises a pair of superconducting blocks.

FIGS. 9($a$), 9($b$), 9($c$) and 9($d$) are sectional views of two different magnetic shields of examples of the second invention.

DETAILED DESCRIPTION OF THE INVENTION

The genus invention of the present invention relates to a static magnetic refrigerator comprising a magnet generating a high-intensity magnetic field, a magnetic working material disposed in the high-intensity magnetic field, a superconducting magnetic shield disposed between the magnet and the magnetic working material, and a rotating means for rotating the superconducting magnetic shield, the superconducting magnetic shield comprising a pair of superconducting bodies being capable of simultaneously rotating around the magnetic working material, and being arranged such that each of the superconducting bodies is spacedly disposed around the magnetic working material with a space and lateral magnetic passages communicating with the space, whereby a magnetization process wherein the magnetic working material is magnetized in the high-intensity magnetic field by way of rotating the superconducting magnetic shield at a position allowing the permeation of the magnetic field through the magnetic working material via the magnetic passages and the space and a demagnetization process wherein the magnetic working material is demagnetized by way of further rotating the superconducting magnetic shield at another position permitting the shield of the magnetic field via the superconducting bodies are repeated by the rotating means so that the magnetic working material generates coldness.

The genus invention is explained below by describing the first and second inventions.

The magnetic shield of the static magnetic refrigerator of the first invention is formed by a pair of nearly parallel flat plates or a pair of outwardly curved plates facing each other and being made of superconductors, and the magnetic working material is accommodated in the inner space formed by the pair of the flat or curved plates, whereby a magnetization process wherein the magnetic working material is magnetized in the high-intensity magnetic field by way of rotating the superconducting magnetic shield at a position allowing the permeation of magnetic field through the pair of the flat or curved plates, and a demagnetization process wherein the magnetic working material is demagnetized by way of further rotating the superconducting magnetic shield at another position permitting the shield of the magnetic field via the pair of the flat or curved plates are repeated by the rotating means so that the magnetic working material generates coldness. The first invention uses the space between the pair of the superconducting plates as a magnetic passage and a space around the magnetic working material.

Instead of the flat or curved plates of the first invention, the second invention uses superconducting blocks as the magnetic shield. The magnetic shield is formed by a pair of superconducting blocks and the magnetic working material is accommodated in the inner space formed by the pair of the blocks, whereby a magnetization process wherein the magnetic working material is magnetized in the high-intensity magnetic field by way of rotating the superconducting magnetic shield at a position allowing the permeation of magnetic field through the pair of the blocks and a demagnetization process wherein the magnetic working material is demagnetized by way of further rotating the superconducting magnetic shield at another position permitting the shield of the magnetic field via the pair of the blocks are repeated by the rotating means so that the magnetic working material generates coldness.

Although an iron-cored electric magnet or a permanent magnet can be used as the magnet for the magnetic refrigerator of the present invention, a superconducting coil is preferably used to generate a high-intensity magnetic field. More specifically, a pair of superconducting coils are coaxially arranged in parallel and the magnetic working material is disposed between the superconducting coils. A planar-type superconducting magnet can also be used instead of the superconducting coil.

The first invention is detailed below. The magnetic refrigerator of the first invention basically comprises a magnetic working material fixed in a constant-intensity magnetic field and the magnetic working material is disposed so as to be accommodated in the inner space formed by a pair of superconducting flat plates so that the pair of the flat plates form a magnetic shield. When the magnetic shield is used and when the direction of the magnetic lines of force of the magnetic field coincides with the facial direction of the parallel flat plates, the magnetic lines of force permeate into the inner space formed by the inner surfaces of the parallel flat plates, causing a high-intensity magnetic field in the space. When the magnetic lines of force are perpendicular to the parallel flat plates, however, shield current flows through the superconducting flat plates to generate magnetic lines of force which are formed in the direction of canceling the perpendicular magnetic lines of force. As a result, no magnetic field is generated in the inner space of the superconducting parallel flat plates and an almost-zero-intensity magnetic field is obtained in the space. The magnetic lines of force from the magnet pass around a rectangular body having surfaces facing the surfaces of the pair of the parallel flat plates.

Figure 1A:
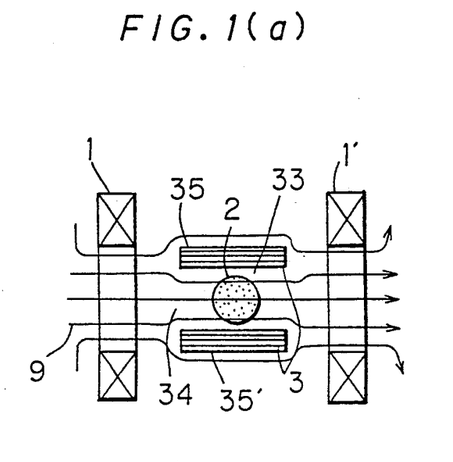
Figure 1B:
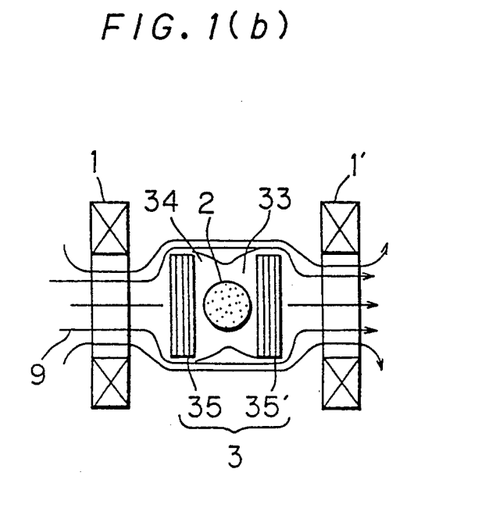

Referring to FIG. 1 which shows the operating principle of the magnetic refrigerator of the first invention, the following description explains the structure of the magnetic refrigerator which uses the magnetically communicating space of the pair of the coaxial superconducting coils as the space for both the magnetization and demagnetization of the magnetic working material.

As shown in FIG. 1 (a), a magnetic working material 2 is fixed in the magnetically communicating space of a pair of coaxial superconducting coils 1 and 1'. When a magnetic shield 3 is set so that the direction of the magnetic lines of force 9 is parallel to the surfaces of flat plates 35, 35', the magnetic lines of force pass through magnetic passage 34 and the inner space 33 between the superconducting parallel flat plates 35, 35' and the magnetic working material 2 disposed in the inner space 33 is magnetized. When the magnetic shield is then rotated 90 degrees around the magnetic working material disposed in the inner space of the magnetic shield as shown in FIG. 1 (b), the parallel flat plates 35, 35' are orthogonal to the magnetic lines of force 9. In this case, the magnetic lines of force 9 pass around the outside of the pair of the superconducting plates 3, 3' disposed back and forth, and do not permeate the inner space 33 of the parallel flat plates 35, 35'. As a result, the magnetic working material 2 disposed in the space 33 can be demagnetized. Since the flat plates 35, 35' are rotated by a rotating means (not shown) so that the parallel and orthogonal conditions of the superconducting flat plates 35, 35' toward the direction of the magnetic lines of force 9 are repeated, the magnetization and demagnetization processes of the magnetic working material can also be repeated. By adiabatically repeating these processes, the magnetic working material 2 generates heat during the magnetization process and generates coldness during the demagnetization process, thereby attaining the function of the magnetic refrigerator.

To prevent the permeation of the external magnetic field so that a completely-zero-intensity magnetic field can be formed in the inner space 33 of the flat plates 35, 35' and to increase the maximum magnetic shielding amount (the maximum external magnetic field intensity capable of maintaining the zero-intensity magnetic field in the inner space), the distance between the flat plates 35 and 35' should be smaller than the length of the flat plate's surface. As the distance d between the rectangular flat plates 35, 35' is smaller than the length of the flat plate's short side a, the maximum magnetic shielding amount is lowered. The relationship of d < a is therefore maintained generally.

Figure 2A:
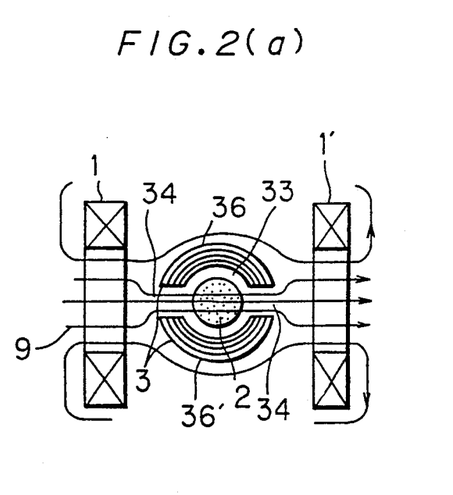
Figure 2B:
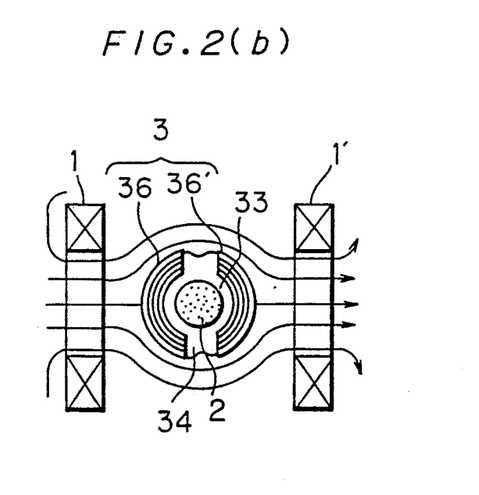

If the distance between the flat plates is large in the demagnetization process shown in FIG. 1 (b), a few magnetic lines of force pass through small gaps at the ends of the flat plates 35 and 35'. It is therefore difficult to reduce the intensity of the magnetic field in the entire inner space of the flat plates 35 and 35' to completely zero. If the magnetic shield is not formed by the superconducting flat plates but is formed by a pair of curved plates 36, 36' facing each other as shown in FIG. 2 (a) and 2 (b) to obtain a partially tubular surface and to shorten the gaps between the ends of the curved plates, the gaps are used as magnetic passages in the magnetization process. In the demagnetization process, since the magnetic lines of force which enter the gaps are scare, the residual magnetic intensity at the magnetic working material can be decreased further.

In addition, if the curved plates 36, 36' are used, the outer surfaces of the curved plates 36, 36' can be almost aligned with the rotating cylindrical surface and this feature is advantageous in that the magnetic shield can be made compact.

Figure 3:
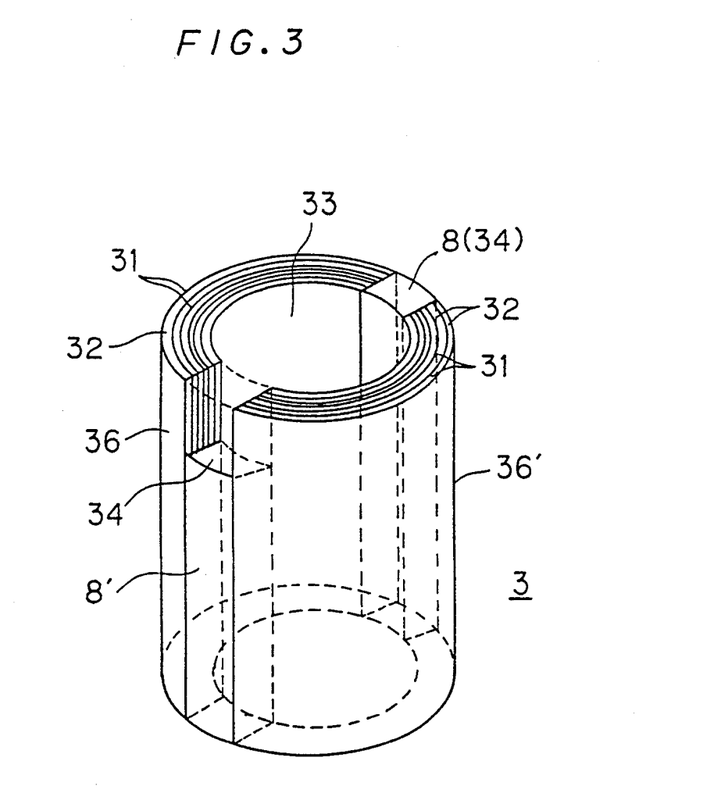
FIG. 3 is a perspective view of the magnetic shield comprising a superconducting curved plates.

The flat plates or the curved plates of the magnetic shield can be made of superconducting materials only. The maximum magnetic shielding amount is greater as the thickness of the superconducting plate is larger. In the case of the flat or curved plates made of a uniform superconducting alloy, the magnetic flux permeated the fringe sections of the plates flows quickly into the inside of the plates, causing partial heating. This flow of the magnetic flux generates on the front surfaces of the plates as a chain reaction and the temperature of the superconducting plates rises over their critical temperature. Finally their superconductivity is apt to be lost. This phenomenon is referred to as "flux jump." To solve this problem, the superconducting magnetic shield 3 of the first invention is desired to be made in the form of the flat or curved plates by using a lamination body comprising thin superconductor pieces 31 and thin plates 32 made of a normal conductor or an insulator as shown in FIG. 3. As the thin superconducting piece 31 is made thinner, the occurrence of flux jump at the thin superconductor layer becomes more difficult. Even if flux jump occurs, it is limited inside the thin superconductor layers 31. In addition, the chain reaction of flux jump is hard to occur. If the thin normal conductor layer 32 is made of a metal with high heat transfer performance, the generated heat is transferred from the thin normal conductor layer 32 to the outside. The danger of temperature rise over the critical temperature is thus lessened. [The above-mentioned inventions relates to U.S. patent application Ser. No. 4942379, European Pat. Appln No. 83910070.0 (Laid-open Pat. Appln No. 0365171/A1) and Canadian Pat. Appln No. 2000104-6 and all of these applications have been filed by the applicants of the present application.]

The total plate thickness of the lamination body comprising the thin superconductor layers 31 can be made smaller than that of the lamination body comprising a single solid superconductor when shielding magnetic fields having the same intensity. In this case, the lamination surfaces of the lamination body are required to be nearly parallel to the surfaces of the flat plates 35, 35' or curved plates 36, 36', since it is necessary to flow current which generates a magnetic field for canceling the magnetic lines of force at the thin superconductor layers of the lamination surfaces perpendicular to the magnetic lines of force in the demagnetization process.

Figure 7A:
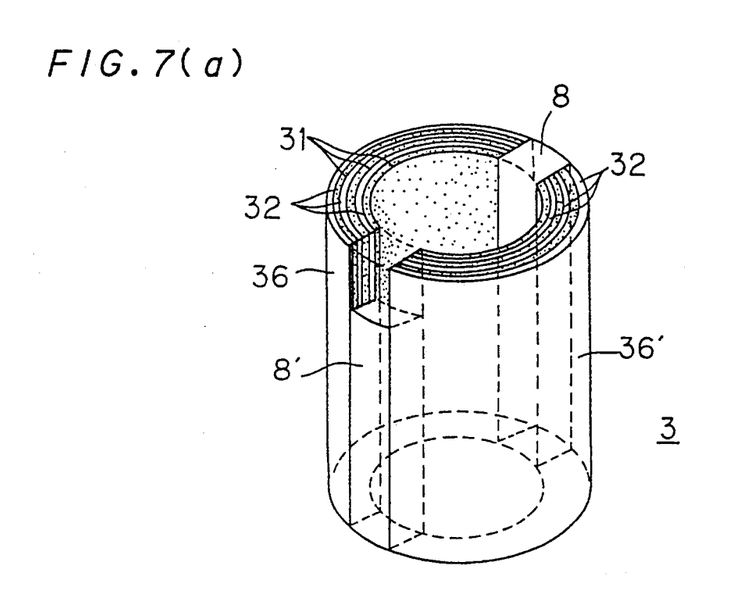

The magnetic shield 3 is formed by the above-mentioned pair of the flat plates 35, 35' or curved plates 36, 36' made of a single solid superconducting body or lamination body. More particularly, the magnetic shield is formed by a metallic superconductor, such as a Nb-Ti alloy or a sintered body of superconductor oxide. When it is used, it is cooled below the critical temperature wherein its superconducting condition can be obtained. Superconductor oxide which can be used below the temperature of liquid nitrogen is Y-Ba-Cu-O-based one such as $Y_1Ba_2Cu_3$ oxide, Bi-Sr-Ca-Cu-O-based one such as $Bi_{1.5}Pb_{0.5}Sr_2Ca_2Cu_3$ oxide or Tl-Ba-Ca-Cu-based one such as $Tl_2Ba_2Ca_2Cu_3$ oxide. A single sintered body made of such a superconductor oxide has sufficient maximum shielding performance, since the oxide is insensitive to an unstable phenomenon due to flux jump even when the thickness of the plate is made larger. In particular, the flat plates 35, 35' or curved plates 36, 36' made of such a sintered body of the superconductor oxide are desired to form a thin superconductor oxide layers 31 and the thin nonmagnetic metallic layers 32 as shown in FIG. 7 (a).

For the magnetic working material 2, a substance, such as a garnet-type gadolinium-gallium oxide, which generates a large change in entropy in the magnetization and demagnetization processes is formed in a predetermined shape and used, or an aluminum compound of a rare earth metal is formed in a predetermined shape and used at a high temperature of 20K or more.

The magnetic refrigerator of the present invention having the above-mentioned structure is a static type wherein the magnetic working material 2 is fixed. The rotating means for rotating the superconducting magnetic shield 3 and bearing sections which support the magnetic shield are only the movable mechanical sections of the magnetic refrigerator. Furthermore, the magnetic shield itself does not rotate or move in parallel. The magnetic refrigerator can, therefore, be made compact and lightweight.

EXAMPLES

The examples of the magnetic refrigerator of the first invention are explained below referring to the accompanying drawings.

FIGS. 4(a), 4(b), 5(a) and 5(b) are the sectional views of examples of the magnetic refrigerator of the present invention. In these figures, superconducting coils 1, 1' are coaxially disposed and fixed. In addition, the superconducting coils 1, 1' are formed by winding Nb-Ti alloy wires, dipped and cooled in liquid helium and maintained in a superconducting condition. During the refrigerating operation, constant current flows continuously in the superconducting coils 1, 1'.

As shown in FIG. 3, the superconducting magnetic shield 3 comprises a pair of curved superconducting plates 36, 36' facing each other. The gaps provided in the circumferential direction of the pair of the curved plates 36, 36' are filled with nonmagnetic reinforcing members 8, 8' to reinforce the magnetic shield 3. The superconducting curved plates 36, 36' are lamination layer bodies comprising a plurality of Nb-Ti alloy foil pieces with a thickness of several $\mu$m and a plurality of aluminum foil pieces with a thickness of several tens $\mu$m. The reinforcing members 8, 8' are made of nonmagnetic stainless steel. The superconducting curved plates 36, 36' and the reinforcing members 8, 8' form a cylindrical body and the inner and outer circumferential surfaces of the cylindrical body are reinforced by nonmagnetic tubes (not shown).

The above-mentioned cylindrical body including the magnetic shield 3 is dipped in liquid helium stored in a ring-shaped container 34, cooled to the superconducting temperature range and fixed in the container 39. The container 39 is disposed at the lower section of the refrigerator and rotatable around the center axis of the cylindrical body via a bearing member 73. In this example, a motor 7 and transmission gears 71 and 72 rotate the container 34.

Inside the ring-shaped container 39, that is, in the inner space of the magnetic shield 3, the magnetic working material 2 is fixed by an adiabatic protection tube 28. The magnetic working material 2 has the shape of a cylinder which has a hollow section extending in the direction of its center axis, and is made of Gd-Ga oxide garnet. In the hollow section, bar bodies 61 made of crystal ($SiO_2$) are inserted and both the end surfaces of the bar bodies 61 are accurately flush with both the cylindrical end surfaces of the magnetic working material 2 and face the crystal connection discs 62 and 63.

A lower-temperature side heat source (bath) 51, that is, a copper-block cold bath 51 to be cooled in this example, is fixed by the adiabatic protection tube 28. The upper surface of the cold bath 51 contacts one end surface of a fixed heat transfer member 65 made of crystal and the upper vertical surface 691 of the fixed heat transfer member 65 closely contacts the lower vertical surface 691 of a movable heat transfer member 64, thereby heat conduction between the fixed heat transfer member 65 and the movable heat transfer member 64 is not hindered. When the movable heat transfer member 64 is slid upward along the vertical surface 691, the upper end surface of the member closely contacts the lower end surface of the disc 62 of the magnetic working material 2. When the movable heat transfer member 64 is slid downward, a gap G is generated between the upper end surface of the heat transfer member 64 and the lower end surface of the disc 62. If the gap G is set to 50 μm or more, a sufficient adiabatic effect is obtained at an ultra-low temperature of 20 K. or less in a high vacuum condition. The vertical sliding operation of the movable heat transfer member 64 can thus function as a low-temperature heat switch.

In the same way as described above, the magnetic working material 2 is connected to a higher-temperature side heat source (bath), e.g. a compact gas cooler 41 by a movable heat transfer member 66 made of crystal and a fixed heat transfer member 67 via a heat transfer member 68 made of copper. The movable heat transfer member 66 slides to function as high-temperature heat switch.

Both the movable heat transfer members 64 and 66 are held by a rod 77 and moved vertically in connection to each other by a screw means (not shown) driven by a stepping motor 76. Since a sufficient heat shut-off effect is obtained by a vertical movement distance of about 1 mm, a cam means or a solenoid pushing means can also be used as a vertical movement means. The entire apparatus is disposed in a vacuum container and maintained in an adiabatic condition.

Figure 4A:
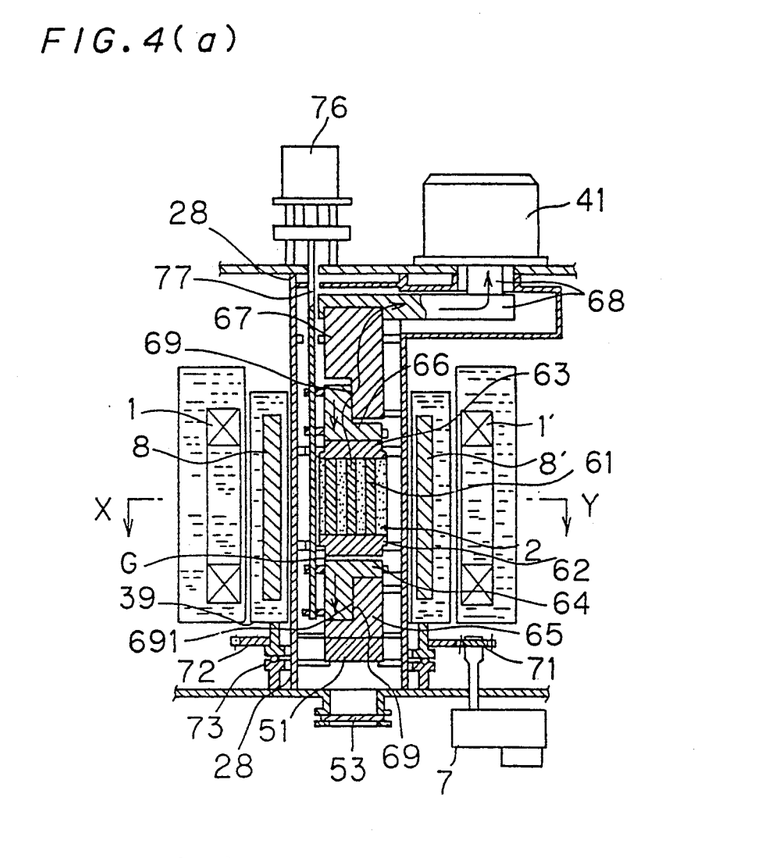
Figure 4B:
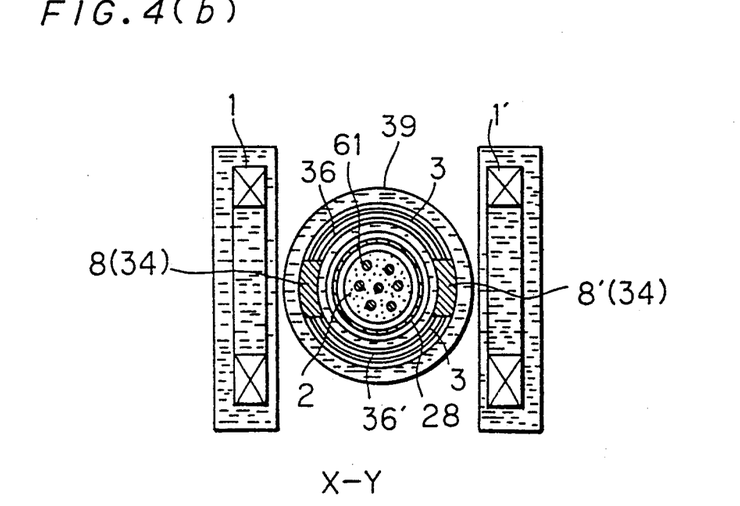

FIGS. 4(a) and 4(b) show the magnetization process of the magnetic working material 2. The pair of the reinforcing members 8, 8' filled in the spaces between the ends of the magnetic shielding superconducting curved plates 36, 36' are positioned on the center axis of the pair of the coils. Since the reinforcing members 8, 8' are nonmagnetic, the magnetic lines of force from the pair of the coils permeate and magnetize the magnetic working material 2. At this time, the magnetic working material 2 is heated. When the rod 77 is pushed down by a stepping motor 76, the movable heat transfer member 66 contacts the upper disc 63 and heat can conduct between the magnetic working material 2 and the cooler 41 and the magnetic working material 2 can thus be cooled. On the other hand, the movable heat transfer member 64 is also pushed down and the cold bath 51 is thermally shut off from the magnetic working material 2 via the gap G between the heat transfer member 64 and the lower disc 62, thereby preventing the temperature of the cold bath 51 from rising.

Figure 5A:
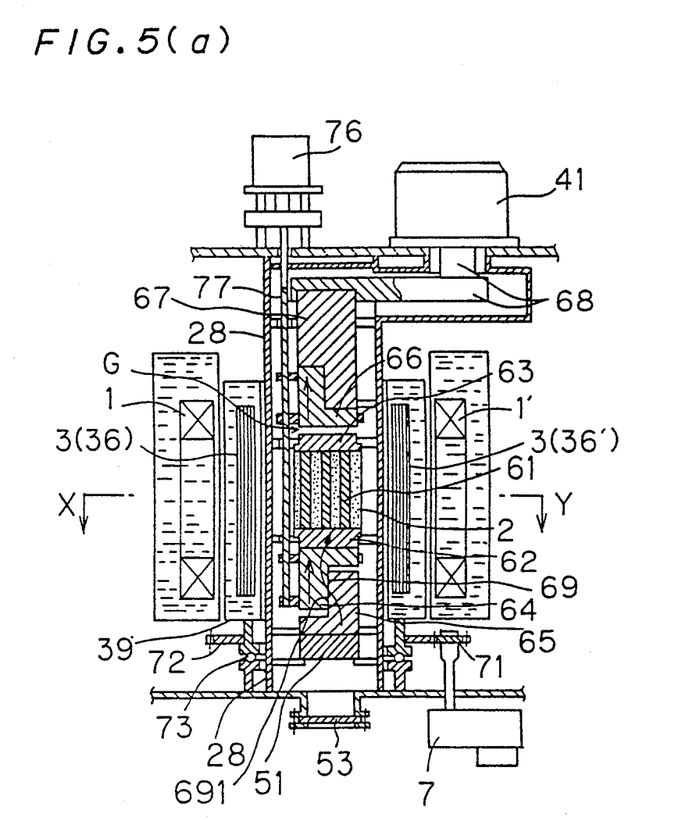
Figure 5B:
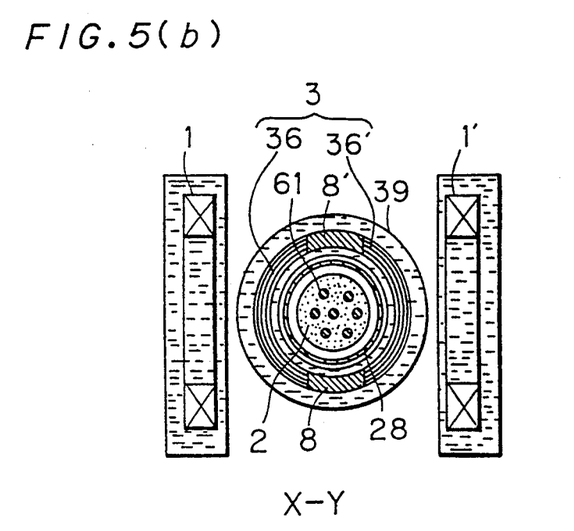

When the magnetic shield 3 is rotated 90 degrees by the motor 7 as shown in FIGS. 5(a) and 5(b), the superconducting curved plates 36, 36' become orthogonal to the center axis of the coil, shutting off the permeation of the magnetic lines of force to the inner space of the shield. The magnetic working material 2 is, therefore, adiabatically demagnetized and generates coldness to cool itself. When the rod 77 is pulled up, the magnetic working material 2 is thermally shut off from the cooler 41 which functions as a heat bath. On the other hand, since the movable heat transfer member 64 closely contacts the lower disc 62 and heat can conduct to the cold bath 51 and the cold bath can be cooled. Since this cooling is performed together with the rotation, the cold bath 51 can be maintained in the cooling condition at all times by repeating the above-mentioned demagnetization and magnetization processes, thereby creating a static magnetic refrigerator.

This kind of a magnetic refrigerator can be used for infrared image detection units (not shown) generating extremely low heat noise by attaching a solid-state infrared image sensor (not shown) on the copper block of the cold bath 51 and by forming an infrared image (generated outside) on the image sensor through a transparent sight glass 53.

Figure 6:
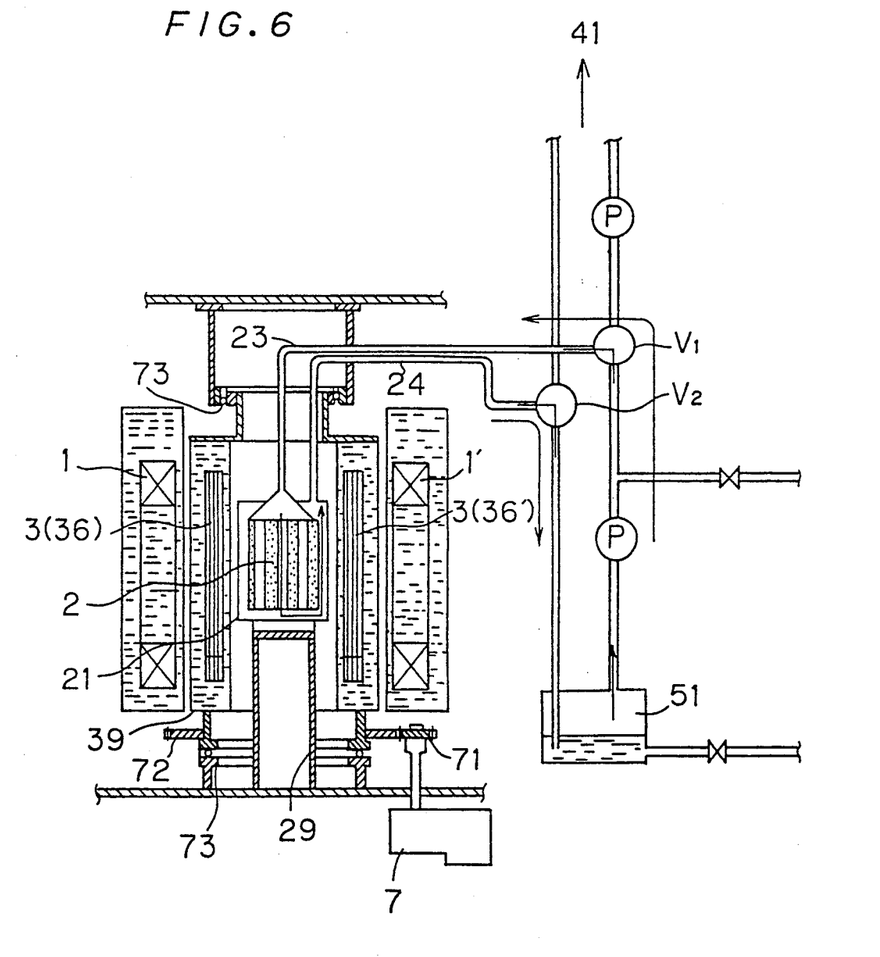
FIG. 6 is a sectional view of another example of the magnetic refrigerator of the first invention.

FIG. 6 shows a sectional view of a magnetic refrigerator used below the temperature of liquid nitrogen. The superconducting coils 1, 1', the superconducting magnetic shield 3 and the rotating members 7, 71, 72 and 73 of this refrigerator are nearly similar to those used for the magnetic refrigerator (shown in FIGS. 4 and 5) operating at the above-mentioned ultra-low temperature. However, $Y_1Ba_2Cu_3$ oxide is used as a superconductor for the superconducting wires of the superconducting coils and the magnetic shield 3. In this case, the structure of the magnetic shield 3 is shown in FIG. 7(a). More particularly, the pair of the curved plates 36, 36' are formed by a layer lamination body comprising $Y_1Ba_2Cu_3$ oxide layers 31 and silver foil layers 32. The reinforcing members 8, 8' made of nonmagnetic 18-8 stainless steel are inserted and joined in the space between its end surfaces facing the curved plates 36, 36' and formed into a cylindrical shape.

Figure 7B:
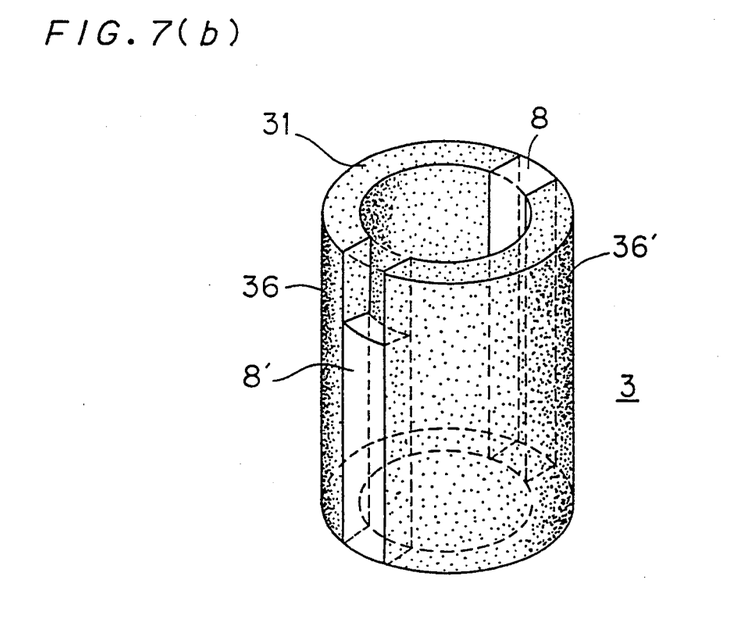

In stead of the curved plates 36, 36' having a laminated structure, the superconducting curved plates 36, 36' formed by the above-mentioned single sintered body of superconductor oxide can also be used as shown in FIG. 7(b).

As shown in FIG. 6, the above-mentioned superconducting coils 1, 1' and the superconducting magnetic shield 3 are dipped in liquid nitrogen so that the superconducting condition can be maintained.

The magnetic working material 2 has the shape of a cylinder having a hollow section with openings at both ends of the cylinder. Heat transfer medium passes through a pipe 23 and the hollow section of the magnetic working material 2 and is exhausted from a pipe 24 via a container 21 which covers the outer surface of the magnetic working material 2. FIG. 6 shows the demagnetization process of the magnetic working material 2, wherein the pair of the superconducting curved plates 36, 36' are disposed in the direction of the center axis of the superconducting coils 1, 1'. The heat transfer medium gas is circulated by a pump P between the cold bath 51 and the magnetic working material 2 and cooled. Liquefied gas is then accumulated at the bottom section of the cold bath 51 for future use.

In the magnetization process, when the magnetic shield 3 is rotated 90 degrees from the condition shown in FIG. 6 by the rotating members 7, 71, 72 and 73 as described above, the magnetic working material 2 is magnetized and heated. At this time, valves $V_1$ and $V_2$ connected to the pipes 23 and 24 are switched, and the magnetic working material 2 is cooled by the medium gas to be supplied from the hot bath 41.

In this example, if a sintered $DyAl_2$ compound body is used for the magnetic working material 2, if hydrogen is used as the heat transfer medium and if a cooler which uses inexpensive liquid nitrogen is used for the heat bath 41, liquid hydrogen having a temperature of 20K is obtained in the cold bath 51. Cooling liquid or gas such as hydrogen, neon, carbon monoxide, argon, nitrogen or oxygen to be used as medium gas is obtained and used as a refrigerant.

In the case of this example of the refrigerator, the magnetic shielding condition and the magnetic field permeation condition of the magnetic working material 2 can be repeated by rotating the superconducting magnetic shield 3 by only 90 degrees alternately or intermittently. The magnetic shield 3 should be rotated quickly only when the magnetic working material 2 is magnetized and demagnetized, and the magnetic shield 3 should be stopped rotating and held stationary during heat exchange by the use of gas to increase the heat efficiency of the refrigerator. The switching operation of the selection valves $V_1$ and $V_2$ can be interlocked with the rotation of the magnetic shield 3.

The second invention is then described below. Since the structure of the magnetic refrigerator of the second invention is basically the same as that described in the explanation of the first invention, excluding the structure of the superconducting magnetic shield, only the features of the second invention are described below.

Figure 8A:
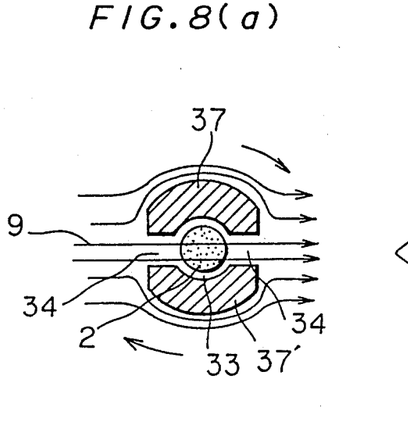
Figure 8B:
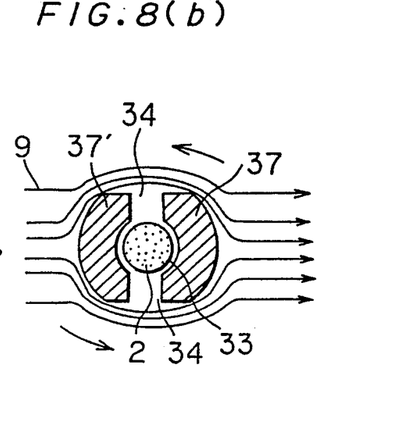

The superconducting magnetic shield is formed by two superconducting blocks. As shown in FIGS. 8(a) and 8(b), two column blocks 37, 37' are disposed facing each other to form a space 33 between the blocks and also to form a magnetic passage 34 which communicates with the space 33. In the space 33, a cylindrical magnetic working material 2 is fixed and the magnetic shield is rotated around the magnetic working material 2 by a rotating means (not shown). When the magnetic passage 34 of the magnetic shield is nearly parallel to the direction of the magnetic lines of force 9 as shown in FIG. 8(a), the magnetic lines of force 9 pass through the magnetic passage 34 to magnetize the magnetic working material 2. When the magnetic shield is rotated 90 degrees as shown in FIG. 8(b), the magnetic lines of force 9 are shielded by the superconducting blocks 37, 37' of the magnetic shield. The magnetic lines of force 9 cannot pass through the magnetic passage 34 which is orthogonal to the magnetic lines of force 9 and the magnetic working material 2 is demagnetized. Consequently, by using the above-mentioned superconducting blocks for the magnetic refrigerator described as the example of the first invention, the magnetic refrigerator can be easily configured.

Figure 9A:
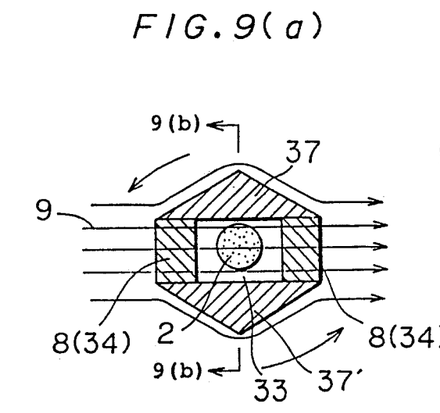
Figure 9B:
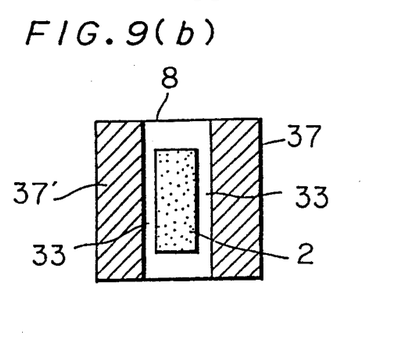

FIGS. 9(a) and 9(b) show examples wherein the magnetic working material 2 is disposed between the facing side surfaces of the superconducting blocks 38 and 38' having the shape of a triangular column.

Figure 9C:
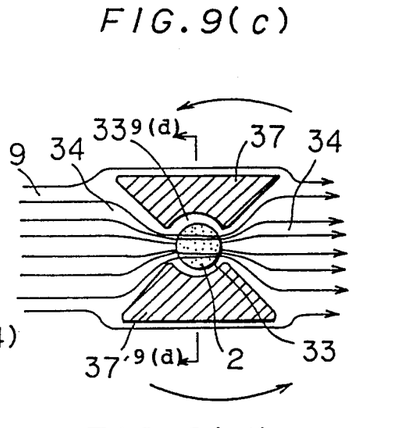
Figure 9D:
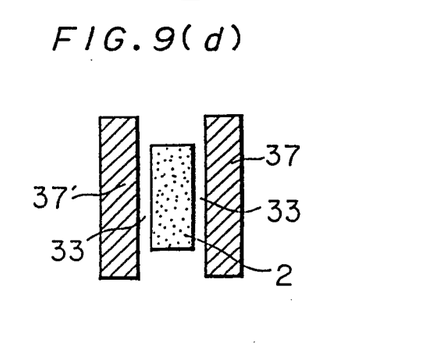

FIGS. 9(c) and 9(d) show examples wherein the magnetic passages 34, 34 formed by the two superconducting blocks 37 and 37' are expanded to the outside of the magnetic shield 2. With this example, since the magnetic lines of force 9 are converged at the expansion section of the magnetic passage 34 in the magnetization process, the magnetic flux density of the magnetic working material 2 can be increased. As a result, the change in magnetic flux can be increased in the magnetization and demagnetization processes, thereby increasing the efficiency of the magnetic refrigerator.

Although such superconducting blocks can be formed by a superconducting metal or alloy, a sintered body of superconductor oxide should be exclusively used for magnetic refrigerators to be used in relatively high-temperature ranges. The blocks can be easily made by forming the superconductor oxide described in the explanation of the first invention into a predetermined block shape and by heating to sinter the formed material at high temperature. The two superconducting blocks 37, 37' can be assembled to the magnetic shield by joining the blocks with a reinforcing member 8, such as normal conducting, nonmagnetic metal or ceramics as shown in FIG. 9(a). With this structure, the reinforcing member 8 can also function as the magnetic passage 34.

We claim:

1. A static magnetic refrigerator comprising:
a magnet generating a high-intensity magnetic field,
a magnetic working material disposed in the high-intensity magnetic field,
a superconducting magnetic shield disposed between the magnet and said magnetic working material, and
a rotating means for rotating said superconducting magnetic shield,
said superconducting magnetic shield comprising a pair of superconducting bodies being capable of simultaneously rotating around said magnetic working material, and being arranged such that each of said superconducting bodies is spacedly disposed around the magnetic working material with a space and lateral magnetic passages communicating with the space,
whereby a magnetization process wherein said magnetic working material is magnetized in the high-intensity magnetic field by way of rotating said superconducting magnetic shield around said magnetic working material at a position allowing the permeation of the magnetic field through said magnetic working material via the magnetic passages and the space and a demagnetization process wherein said magnetic working material is demagnetized by way of further rotating said superconducting magnetic shield at another position permitting the shield of the magnetic field via said superconducting bodies are repeated by said rotating means so that said magnetic working material generates coldness.

2. A static magnetic refrigerator comprising:
a magnet generating a high-intensity magnetic field,
a magnetic working material disposed in the high-intensity magnetic field.

a superconducting magnetic shield disposed between the magnet and said magnetic working material, and a rotating means for rotating said superconducting magnetic shield, said superconducting magnetic shield comprising a pair of nearly parallel flat plates or a pair of outwardly curved plates facing each other and made of a superconductor, and said magnetic working material is accommodated in the inner space formed by the pair of said flat or curved plates, whereby a magnetization process wherein said magnetic working material is magnetized in the high-intensity magnetic field by way of rotating said superconducting magnetic shield around said magnetic working material at a position allowing the permeation of the magnetic field through said magnetic working material via the pair of said flat or curved plates and a demagnetization process wherein said magnetic working material is demagnetized by way of further rotating said superconducting magnetic shield at another position permitting the shield of the magnetic field via the pair of said flat or curved plates are repeated by said rotating means so that said magnetic working material generates coldness.

3. A static magnetic refrigerator comprising:

a magnet generating a high-intensity magnetic field, a magnetic working material disposed in the high-intensity magnetic field, a superconducting magnetic shield disposed between the magnet and said magnetic working material, and a rotating means for rotating said superconducting magnetic shield, said superconducting magnetic shield comprising a pair of blocks made of a superconductor, and said magnetic working material is accommodated in the inner space formed by the pair of said blocks, whereby a magnetization process wherein said magnetic working material is magnetized in the high-intensity magnetic field by way of rotating said superconducting magnetic shield around said magnetic working material at a position allowing the permeation of the magnetic field through said magnetic working material via the pair of said blocks and a demagnetization process wherein said magnetic working material is demagnetized by way of further rotating said superconducting magnetic shield at another position permitting the shield of the magnetic field via the pair of said blocks are repeated by said rotating means so that said magnetic working material generates coldness.

4. A static magnetic refrigerator according to claim 1, 2 or 3, wherein one end surface of said magnetic working material is connected to a high-temperature heat bath via a high-temperature heat switch means to allow heat transfer to said high-temperature heat bath and the other end surface of said magnetic working material is connected to a low-temperature heat bath via a low-temperature heat switch means to allow heat transfer to said low-temperature heat bath.

5. A static magnetic refrigerator according to claim 4, wherein said high-temperature heat switch means is arranged such that a movable heat transfer member is disposed close to said magnetic working material and reciprocative by a reciprocating means so that the end surface of said movable heat transfer member having a contact sliding surface, which slides along the contact sliding surface provided on a fixed heat transfer member connected to said high-temperature heat bath to allow heat transfer, faces a one end surface of said magnetic working material.

whereby the end surface of said movable heat transfer member repeatedly makes close contact with and separates from the one end surface of said magnetic working material in response to the repetition of the magnetization and demagnetization processes.

6. A static magnetic refrigerator according to claim 4, wherein said low-temperature heat switch means is arranged such that a movable heat transfer member is disposed close to said magnetic working material and reciprocative by a reciprocating means so that the end surface of said movable heat transfer member having a contact sliding surface, which slides along the contact sliding surface provided on a fixed heat transfer member connected to said low-temperature heat bath to allow heat transfer, faces the other end surface of said magnetic working material.

whereby the end surface of said movable heat transfer member repeatedly makes close contact with and separates from the other end surface of said magnetic working material in response to the repetition of the magnetization and demagnetization processes.

7. A static magnetic refrigerator according to claim 1, 2 or 3, wherein said superconducting magnetic shield is a lamination body comprising thin superconductor layers and thin normal conductor or insulator layers and formed into said flat or curved plates.

8. A static magnetic refrigerator according to claim 1, 2 or 3, wherein said superconducting magnetic shield is a formed sintered body of superconductor oxide powder or a formed sintered body comprising thin superconductor oxide layers and thin nonmagnetic metal layers and formed into said flat or curved plates.

* * * * *